W. S. & A. D. SEAMAN.
EXTENSION-TABLE.
No. 181,986. Patented Sept. 5, 1876.
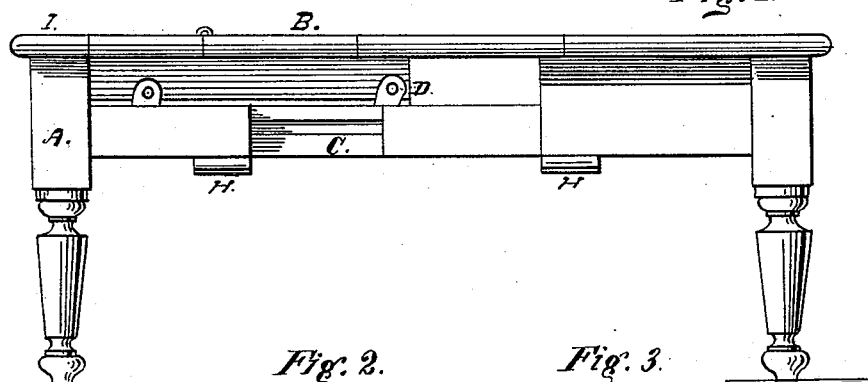
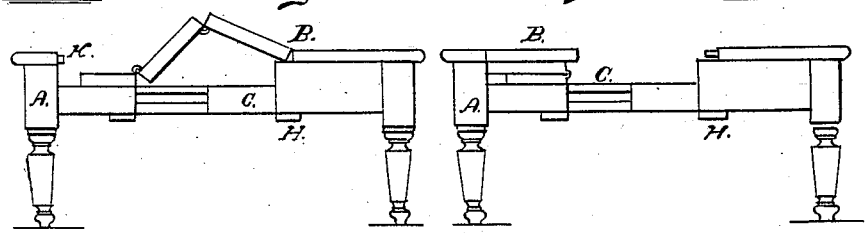
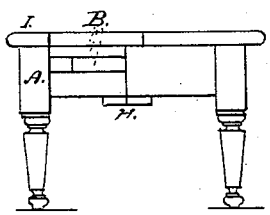
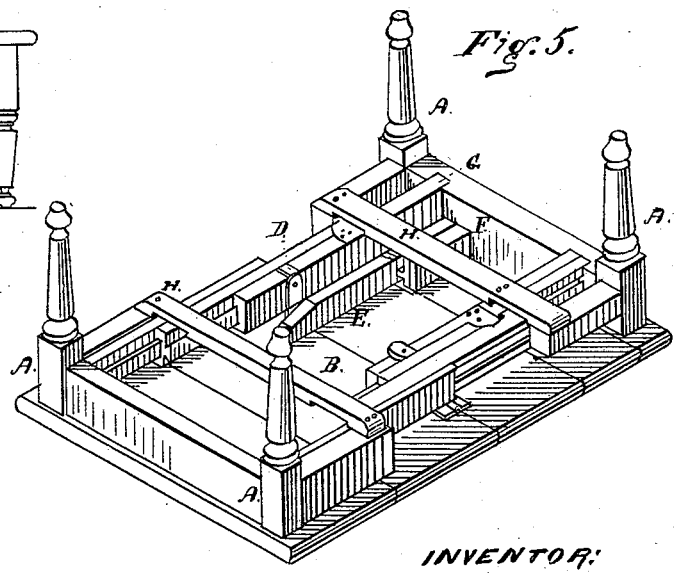
WITNESSES: INVENTOR:

UNITED STATES PATENT OFFICE.

WILLIAM S. SEAMAN AND ALONZO D. SEAMAN, OF MILWAUKEE, WIS.

IMPROVEMENT IN EXTENSION-TABLES.

Specification forming part of Letters Patent No. 181,986, dated September 5, 1876; application filed February 1, 1876.

*To all whom it may concern:*

Be it known that we, WILLIAM S. SEAMAN and ALONZO D. SEAMAN, of Milwaukee, in the county of Milwaukee, in the State of Wisconsin, have invented certain Improvements in Extension-Tables, of which the following is a specification:

The object of our invention is to arrange an extension-table so as to have all the parts of same attached together.

This table has the leaves hinged together, and when folded up the first leaf to which the center leaves are hinged drops down and slides out far enough to have the other leaves fold over it, and have the top leaf high enough to be even with the stationary leaves. The movable leaves are attached to the slides.

Figure 1 is a view of our invention drawn out to its full length; Fig. 2, a view of same drawn out with the movable leaves standing up ready to be shoved into place; Fig. 3, a view of a table drawn out with the leaves folded ready to be unfolded or for the table to be shoved together; Fig. 4, a view of a table, the leaves folded, and the table shoved together, making a complete, compact, and small table; and Fig. 5, a view of a table, bottom upward.

A is the legs and frame of the table; B, the movable leaves of same; C, the slides by which it is extended; D, the loops with which the slides which raise and lower the movable leaves are attached to bar G, so that when the slides are pulled out a little they will fall down and make a pocket for the leaves to fall into; E, slide attached by loops D to bar G of the frame of the table; F, a slide to which one of the folding leaves is attached, which slides a little to bring the leaves tight when the table is drawn out; H H, cross-girts which hold the ends of the frame of the table firmly in place; I, outer leaf of the table fastened securely in place; K, dowels in leaf I, passing into one of the leaves B.

The operation of this table is as follows: When the table is extended, as shown in Fig. 1, take hold of leaves B at the middle joint, and raise them up and fold them over onto the leaf attached to slide E; then pull slide E out a little, and it will fall, swinging on loops D enough to make a pocket deep enough so that the top leaf shall be even with the outer leaf I, and fit onto the dowels K; then the table can be shoved together, as shown in Fig. 4; and to extend the table, draw it out and turn the leaves into the position shown in Fig. 2, and press down on the leaves B, and the slide E will be raised and shut, slide F will slip back, and the leaves will come down in place.

We claim as our invention—

1. An extension-table having auxiliary leaves hinged together, and adapted to fold over and lie upon each other when the table is folded, said series of leaves being hinged to a leaf fastened to the extension slides, or to the table-frame, as and for the purpose set forth.

2. The slide E, connected to the bar G by loops D, in combination with the slides C and F, and the hinged leaves B, as and for the purpose set forth.

WILLIAM S. SEAMAN.
ALONZO D. SEAMAN.

Witnesses:
J. B. SMITH,
H. P. SCHNETZKY.